United States Patent [19]

Kojima et al.

[11] 4,054,909
[45] Oct. 18, 1977

[54] METHOD AND SYSTEM FOR BANDWIDTH-COMPRESSED TRANSMISSION OF A VIDEO SIGNAL IN THE NTSC SYSTEM

[75] Inventors: Takamoto Kojima, Kawasaki; Mitsuo Ishii, Yokohama, both of Japan

[73] Assignee: Fujitsu Ltd., Kawasaki, Japan

[21] Appl. No.: 574,149

[22] Filed: May 2, 1975

[30] Foreign Application Priority Data

May 2, 1974   Japan .................................. 50-49340

[51] Int. Cl.$^2$ .............................................. H04N 9/32
[52] U.S. Cl. ...................................................... 358/13
[58] Field of Search .......................... 358/12, 13, 21; 178/DIG. 3; 179/15.55 R

[56] References Cited

U.S. PATENT DOCUMENTS

| | | | |
|---|---|---|---|
| 3,679,821 | 7/1972 | Schroeder | 178/DIG. 3 |
| 3,720,780 | 3/1973 | Remy et al. | 358/13 |
| 3,720,786 | 3/1973 | Cutler | 178/DIG. 3 |
| 3,736,373 | 5/1973 | Pease | 178/DIG. 3 |
| 3,761,613 | 9/1973 | Limb | 178/DIG. 3 |
| 3,767,847 | 10/1973 | Haskell et al. | 178/DIG. 3 |
| 3,769,451 | 10/1973 | Connor | 178/DIG. 3 |
| 3,773,971 | 11/1973 | Sainte-Beuve | 358/13 |
| 3,784,737 | 1/1974 | Waenner | 178/DIG. 3 |
| 3,803,348 | 4/1974 | Limb et al. | 178/DIG. 3 |
| 3,843,940 | 10/1974 | Ishiguro et al. | 358/13 |
| 3,984,626 | 10/1976 | Mounts et al. | 358/133 |
| 3,996,607 | 12/1976 | Heitman | 358/13 |

FOREIGN PATENT DOCUMENTS

| 1,344,312 | 1/1974 | United Kingdom | 358/13 |
|---|---|---|---|

*Primary Examiner*—Benedict V. Safourek
*Assistant Examiner*—Aristotelis M. Psitos
*Attorney, Agent, or Firm*—Staas & Halsey

[57] ABSTRACT

Bandwidth-compressed transmission of an NTSC-type video signal is performed by converting the analog composite NTSC signals to digital signals and then orthonormally transforming the digital signals corresponding to each horizontal line period of the composite video signal, in the line direction. The transformed, digital signals then are processed to obtain the sum and difference thereof, for each corresponding horizontal line period with respect to those transformed digital signals corresponding to the next preceding horizontal line period. The sum and difference signals then are predictively coded and sequentially transmitted.

21 Claims, 21 Drawing Figures

TIME CHART OF CONTROL SIGNALS AT TRANSMITTER
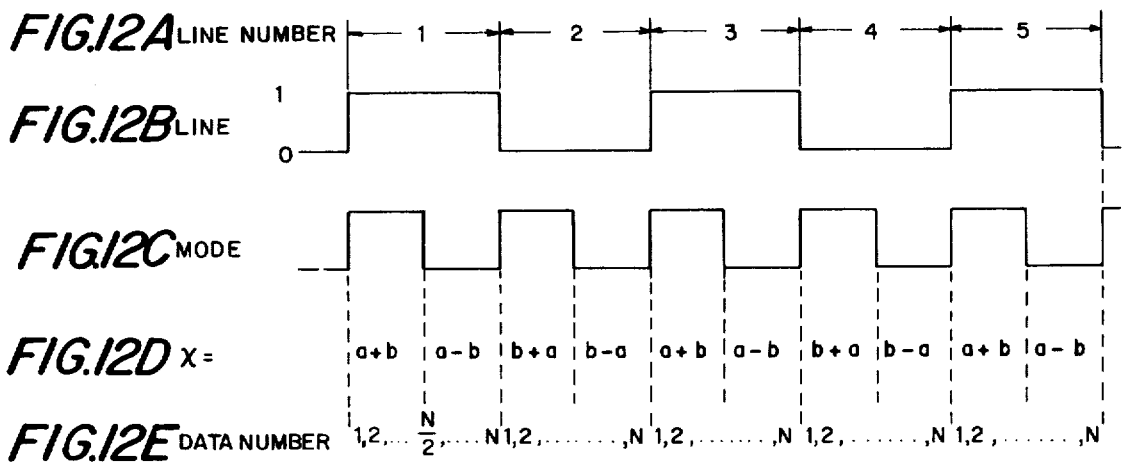
DPCM CODER 4
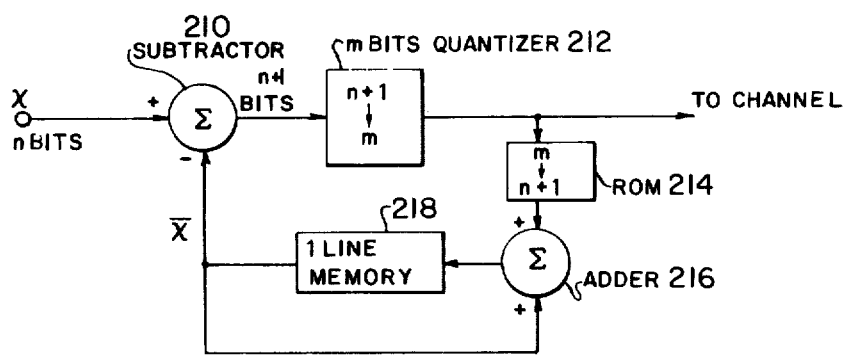
FIG. 13

CIRCUIT DIAGRAM OF RECEIVER

METHOD AND SYSTEM FOR BANDWIDTH-COMPRESSED TRANSMISSION OF A VIDEO SIGNAL IN THE NTSC SYSTEM

BACKGROUND OF THE INVENTION

1. Field of the Invention

The present invention relates to a bandwidth-compression method and system for transmission of a video signal, and more particularly, to a bandwidth-compression method and system for digitally transmitting a video signal in the NTSC system.

2. Description of the Prior Art

A prior art method of bandwidth-compressed video signal transmission in the NTSC system includes the requirement that the video signal be demodulated and discriminated as the luminance signal (Y) and the color signal (I, Q) and that these Y, I, and Q signals, respectively, be transmitted on a bandwidth-compression basis, at the base band.

Hence, in this existing method, the video signal has to be demodulated and separated as the base band signal of Y, I and Q signals. Additional circuits for demodulation and discrimination are inevitably required and the hardware configuration is complicated. This is a serious drawback from an economiccal standpoint.

SUMMARY OF THE INVENTION

The present invention effectively removes such drawbacks of the existing method mentioned above. Basically, the present invention comprises a method and system which function to provide the sum and difference of video signals of the NTSC system at each picture element arranged on the adjacent lines in the vertical direction. The video first is orthonormally transformed in the line direction, the sum and difference signals then are obtained and, in serial, alternating sequence, are predictively coded for bandwidth-compression and transmitted. The receiver then decodes the received signal, transforms the decoded signal and converts it to an analog, NTSC composite video signal.

BRIEF DESCRIPTION OF THE DRAWINGS

While the specification concludes with claims particularly pointing out and distinctly claiming the subject matter which is regarded as the invention, preferred embodiments are disclosed in the following detailed description taken in conjunction with the accompanying drawings, in which:

FIG. 12a–e is a timing chart for explaining control functions occurring in the circuit of FIG. 9;

FIG. 13 is a schematic view of a DPCM coder for use in the circuit of FIG. 9;

DETAILED DESCRIPTION OF THE INVENTION

General Discussion

Figure 1:
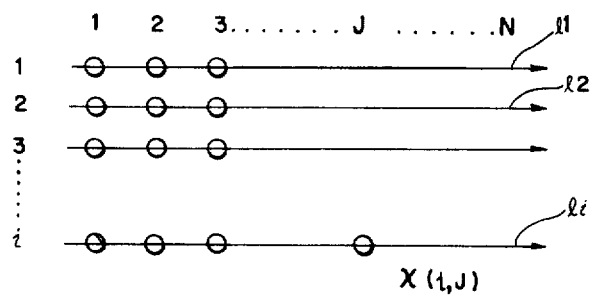
FIG. 1 is an explanatory drawing where the video signal in the NTSC system is sampled and indicated as picture elements.

The present invention relates to a system for and method of bandwidth-compressed transmission of a video signal in the NTSC system.

Bandwidth-compressed transmission of the video signal utilizing spatial correlation of an image can be realized with comparative ease in the case of a monochrome video signal because of there being no interference from the color sub-carrier signal. However, in the case of the color video signal of the NTSC system, the following problems must be resolved. Representing the luminance signal as $Y(t)$ and the color signal as $I(t)$ and $Q(t)$, as is well known, the video signal $Z(t)$ of the NTSC system can be expressed as $$Z(t) = Y(t) + I(t)\cos(\omega_s t + \phi) + Q(t)\sin(\omega_s t + \phi) = Y(t) + C(t)\sin(\omega_s t + \phi) \quad (1)$$

Where, $$C(t) = \sqrt{I^2(t) + Q^2(t)}$$

$$\tan^{-1} = Q(t)/I(t)$$

$\omega_s$: Angular frequency of color sub-carrier signal

The second term of the equation (1) represents the color signal and it generally comprises a waveform component which varies little by little, i.e., progressively, and is superimposed on the luminance signal $Y(t)$ which varies gradually. In addition, as is well known, in the case of the NTSC system, there is a relation established, as shown in equation (2) below, between the color sub-carrier frequency $f_s$ and the horizontal scanning frequency $f_h$ in order to minimize, as much as possible, any interference from the color sub-carrier signal.

$$f_s = 455 \cdot f_h/2 \quad (2)$$

When the scanning period for one horizontal line is given as T, $T = 1/f_h$, and the period $T_s$ of the color sub-carrier is expressed as $T_s = 1/f_s$. Therefore, $$T/T_s = f_s/f_h = 455 \cdot f_h/2/f_h = 455/2 = 227\tfrac{1}{2}$$

As a result, the period of the color sub-carrier shifts by ½ for each line (horizontal scanning line) and therefore the phase thereof shifts by 180°.

Even when considering bandwidth-compression utilizing the spatial nature of the image, since the video signal in the NTSC system has a very complicated waveform, as shown in equation (1), and features due to correlation are not included in the difference between adjacent signals, although some correlation can be observed, for example, in order to carry out the DPCM (Delta PCM) processings, desired bandwidth-compression cannot be realized. One method currently being proposed is that the video signal of the NTSC system is separated first into the Y, I, and Q signal components; these signals then are subjected to DPCM processing and then are transmitted through a multiplexer. When the color video signal is separated into the Y, I and Q signals, distinctive correlation appears within each signal according to the picture, whereby sufficient bandwidth-compression can be realized. For this purpose, however, the video signal of the NTSC system first must be demodulated and separated into the three signal components of Y, I and Q. As a result, picture quality is deteriorated, and additional hardware is also required for demodulation. This is a large disadvantage of this method, when considering the manufacturing cost.

The method and system of the present invention, on the other hand, do not require the initial processing for demodulation and separation of the three signal components of Y, I and Q, yet afford sufficient compression by the separation of only the Y and C signals of equation (1).

The transmission method and system of the present invention is characterized by providing predictive coding for the sum and the difference signals obtained from the video signals of the NTSC system for each of the picture elements arranged on adjacent lines in the vertical direction. The video signal first is orthonormally transformed in the line direction and then the sum and the difference signals are generated and predictively coded in alternate, serial succession for bandwidth-compression, and then transmitted.

DETAILED DISCUSSION

Given in the following are the detailed descriptions of various embodiments of the present invention.

The sampled video signal of the NTSC system can be illustrated for each picture element using circles in a digital form as shown in FIG. 1. In this figure, $i (= 1, 2, 3, \ldots, i)$ represents the line numbers ($l_1$ to $l_i$) and $J (= 1, 2, 3, \ldots N)$, represents the picture element number on each line, and the circles (o) correspond to the picture elements $x (i, J)$.

Now, when considering the picture element at each picture element point arranged in the vertical direction, in other words, the picture element $x (i, J)$ at the point, $J = K$ (constant), the luminance signal $Y(t)$ in the equation (1) does not vary if there is a close correlation in the vertical direction and the color signal $C(t) \sin(\omega_s t + \phi + \phi)$ is the same in amplitude but differs only in phase, by 180°. Therefore, the following equation (3) can be obtained:

$$x(i, J = K) = Z(i) = Y(t) + (-1)^{i-1} C(t) \cdot \text{Const}(J) \quad (3)$$

The sum signal $p(i)$ and the difference signal $q(i)$ of the video signal between the adjacent lines can be expressed, respectively, as follows:

$$p(i) = \{Z(i-1) + Z(i)\}/2 = Y(t) \quad (4)$$

$$q(i) = \{Z(i-1) - Z(i)\}/2 = (-1)^i C(t) \cdot \text{Const}(J) \quad (5)$$

From above equations, the sum signal $p(i)$ corresponds to the luminance signal $Y(t)$ and the difference signal $q(i)$ corresponds to the color signal $C(t)$. In case of the color signal $q(i)$, it polarity changes, according to "$i$" being even or odd; however, if it is required to match the code in each adjacent line, the polarity must be reversed for the alternate lines. In addition, if J is constant, const(J) also becomes constant. These luminance and color signals do not include the influence, or possible interference, of the color sub-carrier, and have close correlation which is the feature of the video signal. Hence, predictive coding is possible even in the vertical direction, and thereby large bandwidth-compression can be realized.

Figure 2:
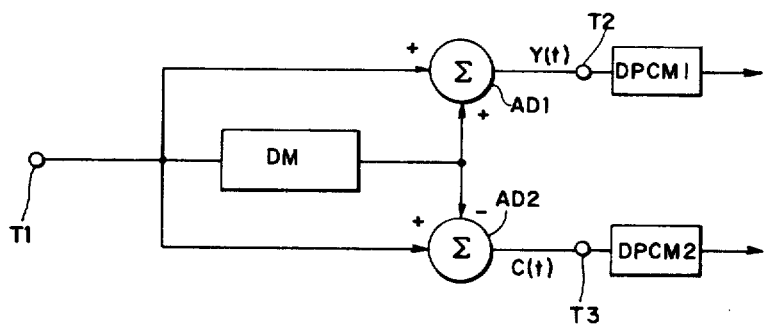
FIG. 2 is a block diagram of the basic organization of the transmission system of the present invention.
Figure 3:
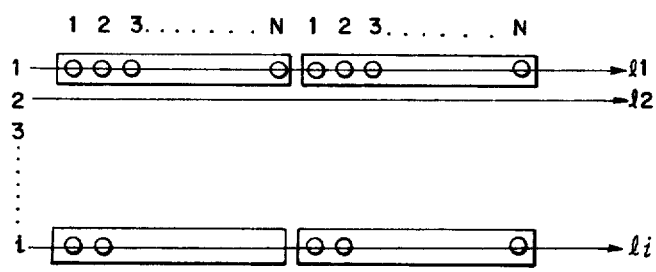
FIG. 3 is an explanatory drawing for providing the Hadamard Transformation in the line direction.

FIG. 2 is a block diagram of the basic organization of the system of the invention, for producing bandwidth-compression. DM is a one (1) line delay memory, and $AD_1$ and $AD_2$ are adder and subtractor circuits, respectively. The video signal of the NTSC system, applied to input terminal $T_1$, is delayed for one horizontal line by the delay memory DM. Then, the delayed signal is added to the video signal of the NTSC system at the adder $AD_1$ and subtracted therefrom at the subtractor $AD_2$. The resulting signals comprise a luminance signal $Y(t)$ supplied to the output terminal $T_2$ and a color signal $C(t)$ supplied to the output terminal $T_3$. These signals are supplied to the predictive encoders $DPCM_1$ and $DPCM_2$, respectively, for bandwidth-compression and subsequent transmission.

In accordance with the invention, the operations performed in accordance with the block diagram of FIG. 2 also are applied to signals which are obtained by or-thonormally transforming the video signal in the NTSC system in the line direction. As to the orthonormal transformation, the Fourier transformation, the Hadamard Transformation and others are operable but Hadamard Transformation is advantageous from the point of view of its circuit. In this method, a large number, N, of picture elements are arranged in a block and the Hadamard matrix is applied to each block. This transformation can be developed as follows, for the case N = 4:

$$\begin{pmatrix} h_1 \\ h_2 \\ h_3 \\ h_4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} x_1 \\ x_2 \\ x_3 \\ x_4 \end{pmatrix}$$

Herein, $h_1, h_2, h_3$ and $h_4$ are the transformed outputs after the Hadamard Transformation: $x_1, x_2, x_3$ and $x_4$ are sample values of each picture element.

The Hadamard Transformation now will be explained. The Hadamard Transformation is an orthonormal transformation; bandwidth-compression is possible, in digital form, according to the technique employed for extracting the transformed output. The transformed output of the Hadamard Transformation is expressed by a number of orders and this number of orders corresponds to the frequency of the analog signal. The number of orders of the Hadamard Transformation can be expressed by the number of variations of code of the Hadamard matrix.

For example, in case of the 4th order Hadamard matrix:

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix},$$

since there is no change of sign in the last row (1 1 1 1), the sequence is of the 0th order; in the case of the 2nd row (1 −1 1 −1), the sign changes three times, thus the sequence is of the 3rd order. Similarly, in the case of the 3rd and 4th rows, the sequences, respectively, are of the 1st order and 2nd order.

Described hereafter is the reason why bandwidth-compression in the digital form is possible by the Hadamard Transformation. For simplification, assume that the analog signal is a D. C. value. In such a case, each sample value of above equation is as follows: $x_1 = a$, $x_2 = a$, $x_3 = a$, $x_4 = a$ (where "a" is a Constant). When the Hadamard Transformation is applied to this, $h_1 = 4a$, $h_2 = 0$, $h_3 = 0$, $h_4 = 0$. Namely, the transformed output appears for only the term of the 0th order of the sequence and no output appears for other terms. In such a case, therefore, the output of only the term of the 0th order of the sequence can be obtained by properly wiring the hardware.

Now, let's consider the other case, of a high frequency analog signal. In this case, the sample values are assumed as follows, also for simplification: $x_1 = a$, $x_2 = -a$, $x_3 = a$, $x_4 = -a$ ("a" being a constant); the transformed output becomes as follows: $h_1 = 0$, $h_2 = 4a$, $h_3 = 0$, $h_4 = 0$. Thus, the transformed output is obtained in this case from the term of the 3rd order of the sequence (the second row in the above example). Therefore, the requirement in this case is to extract the output of the term of the 3rd order of the sequence by wiring the hardware suitably as above. Thereby, bandwidth-compression can be realized digitally.

Figure 4:
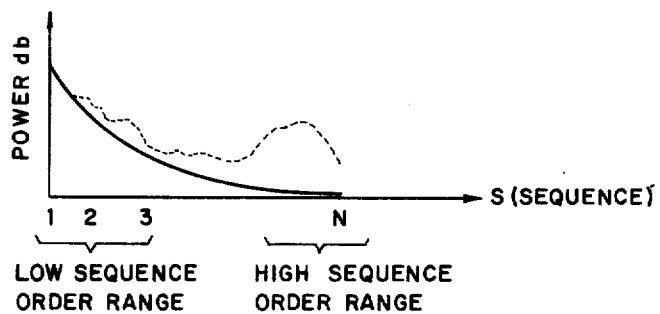
FIG. 4 and FIG. 5, respectively, show the energy distribution of the video signal in relation to the ranges of the sequence orders after transformation.

Assume now a case where the correlation between lines is large and such a relation as $x_1 = x_2 = x_3 = x_4$ exists between the video signals $x_1$ to $x_4$ of respective picture elements (a monochrome video signal, for example). The signal component after the conversion has a certain value at the low order range but becomes almost zero at the high order range, as shown in FIG. 4. For this case, if only the low order component is transmitted and the high order component is omitted, the transmission bandwidth can be narrowed to one-half. However, when the video signal in the NTSC system is subject to the Hadamard Transformation in the line direction, this signal has an energy distribution as shown in FIG. 4 by the dotted line, since it includes the color sub-carrier in the high order area Therefore, as mentioned above, the bandwidth-compression can be performed digitally, by compressing the number of digits in the intermediate order area by means of appropriate hardware wire and thus organizing the hardware in accordance with the nature of the Hadamard Transformation being utilized. Hence, correlation in the line direction is obtained in case of the present invention, whereby bandwidth-compression is attained.

Since the Hadamard conversion is a linear transformation, the above equation (3) can be applied to the signal after the transformation, namely:

$$H(i,J) = \alpha(i,J) + (-1)^{i-1}\beta(i,J)\cdot\text{const}(J) \tag{6}$$

The first term of equation (6) comprises the luminance component and the second term, the color component. Thus, the sum and the difference of $H(i,J)$ between lines are performed with $J$ kept constant, as above, and the luminance component $\alpha(i,J)$ and color component $\beta(i,J)$ are extracted. In other words, $$P'(i,J) = \{H(i-1,J) + H(i,J)\}/2 \tag{7}$$

$$= \alpha(i,J)$$

$$Q'(i,J) = \{H(i-1,J) - H(i,J)\}/2 \tag{8}$$

$$= (-1)^i \beta(i,J) \text{ const}(J)$$

Figure 5:
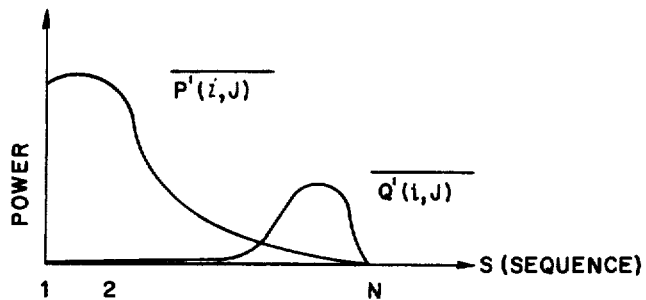

As shown in FIG. 5, $P'(i,J)$ becomes very small in the high order range where $J$ is large, and $Q'(i,J)$, containing the color component $\beta(i,J)$, becomes very small at the low order range where $J$ is small. Therefore, bandwidth-compression is achieved by digitally compressing the intermediate order region. In this figure, $\overline{P'(i,J)}$ and $\overline{Q'(i,J)}$, respectively, show the average values about line "$i$". When $J$ is kept constant, and since $P'$ and $Q'$, respectively, corresponding to the luminance signal component and the color signal component, adaptation of a predictive coding system thereto is easily accomplished.

Figure 6:
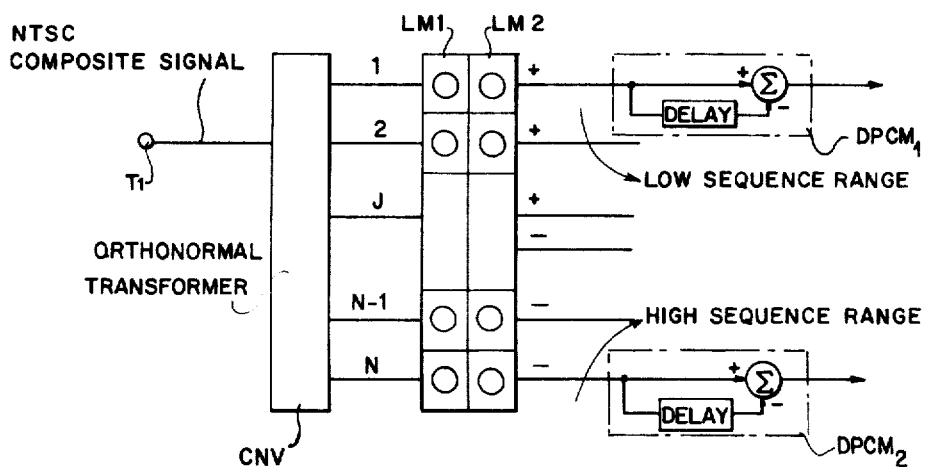
FIG. 6 is a block diagram of the transmission system of the invention of providing bandwidth-compression in the line and vertical directions.

FIG. 6 shows a circuit configuration for achieving bandwidth-compression in the line and vertical directions. CNV denotes an orthonormal transformer and $LM_1$ and $LM_2$ comprise line memories. Receiving the video signal of the NTSC system from the input terminal $T_1$, circuit CNV orthonormally transforms the sampled signals in the line direction for every N signals and stores the transformed signals selectively in the line memories $LM_1$ and $LM_2$. The storing is performed alternatively, that is, when the orthonormally transformed signal of a given line is stored in the memory $LM_1$, that of the next line is stored in the memory $LM_2$, and the next successive line then is stored in the memory $LM_1$, and so forth, in alternating succession. The luminance signal is obtained from the sum of the stored values of the $LM_1$ and $LM_2$ memories, where N is small. On the other hand, the color signal is obtained from the difference of the stored values of the $LM_1$ and $LM_2$ memories where N is large. If the stored value of $LM_2$ is always subtracted from that of $LM_1$, in obtaining this difference value, it is not necessary to provide a circuit for reversing the polarity for each successive line and a color signal of positive polarity always is obtained. Therefore, by transmitting only these low order and high order signals, bandwidth-compression is achieved.

A Fourier Transformation can be used in the alternative to the Hadamard Transformation for the above orthonormal transformation as mentioned previously.

Hereinafter, the present invention will be explained in detail concerning an embodiment wherein the Hadamard Transformation is used for the orthonormal transformation.

Figure 7:
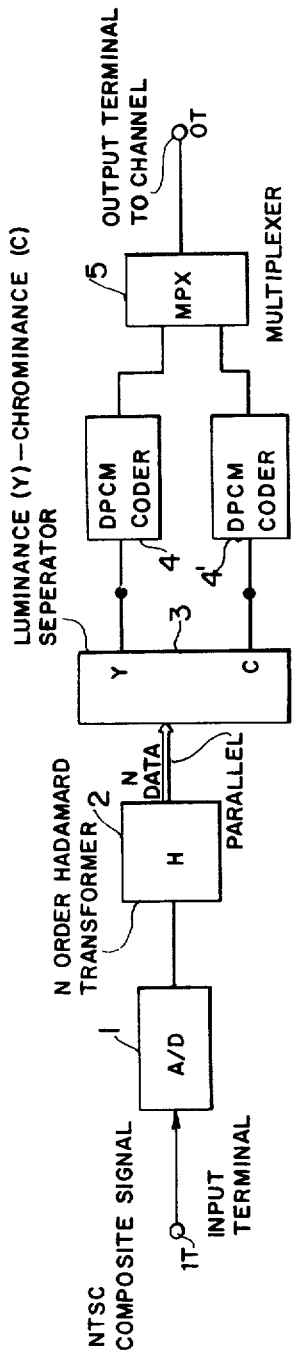
FIG. 7 is a block diagram of a transmitter in accordance with the invention, utilizing an N-order Hadamard Transformation.

FIG. 7 shows a block diagram of a transmitter, including an analog to digital converter 1, an N-order Hadamard Transformer 2, a luminance (Y)-Chrominance (C) separator 3, DPCM (Delta-PCM) coders 4 and 4'; and a multiplexer 5.

The NTSC composite signal applied to the input terminal IT enters the A/D converter 1 and is converted into a digital signal. This digital output then is applied to the N-order Hadamard Transformer 2 and is subjected to the Hadamard Transformation of N-order. The transformed signal then is supplied to the luminance (Y)-Chrominance (C) separator 3, in which it is separated into the luminance signal (Y) and the chrominance signal (C), these signals then, respectively, being applied to the DPCM coders 4 and 4', for DPCM processing. Thereafter, each of the DPCM processed signals is supplied to the multiplexer 5 for multiplexing and the multiplexed signal at the output terminal OT then is transmitted over the transmission path.

Figure 8:
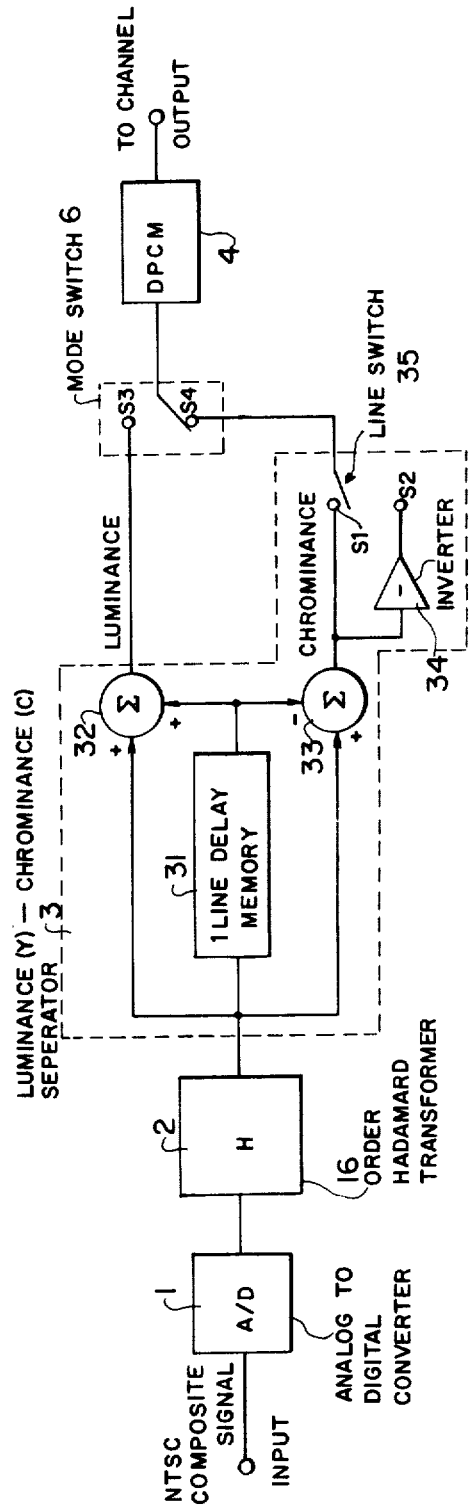
FIG. 8 is a block diagram of a transmitter having a 16 order Hadamard Transformation.

FIG. 8 shows an example of a circuit configuration in the transmitter having a 16-order Hadamard Transformation. In FIG. 8, elements common to FIG. 7 are identified by the same numbers. The circuit includes a 1 line delay memory 31, an adder 32, a subtractor 33, an inverter 34, a line switch 35 and a mode switch 6. The NTSC composite signal supplied to the input terminal is A/D converted at 1 and then subjected to the Hadamard Transformation by the Hadamard Transformer 2. This process is the same as that in FIG. 7. A transformed output of a 16-order sequence is obtained from the Hadamard Transformer 2 as mentioned above. In the case of the circuit configuration shown in FIG. 8, the power is distributed as the luminance (Y) signal from 0 to 7-order sequence and as the chrominance (C) signal from 8 to 15-order sequence. The operation for extracting these signals is executed by the mode switch 6, as will be described later.

The 16-order signal resulting from the Hadamard Transformation is sent to the 1 line delay memory 31, adder 32, and subtractor 33. The 1 line delay memory 31 may comprise a conventional shift register, and provides the transformed signal, delayed in time by 1 (one) line, to each of the adder 32 and subtractor 33. The adder 32 and subtractor 33 produce, respectively, the sum and the difference of the present signal and the 1 line delayed signal. As a result, the sum and the difference outputs comprise the sum signal $P'(i, J)$ and the difference signal $Q'(i, J)$ of the video signal between the adjacent lines as shown in equations 7 and 8. Now, since the output of the subtractor changes in polarity for each successive line, line switch 35 selects the outputs from terminals S1 and S2 in alternate succession such that the opposite polarity output is inverted by inverter 34 and derived from terminal S2, thereby to provide a common polarity output to terminal S4 of mode switch 6.

Thus, the sum and the difference signals between the adjacent lines from the adder 32 and subtractor 33, after the Hadamard Transformation, are output in series, from the 0th to the 15th-order sequence. Here, during the period from 0-order to 7-order sequence, the output is connected to the terminal S3 and during the period of 8-order to 15-order sequence, the output is connected to the terminal S4 by means of the mode switch 6. Thereby the signals $\overline{P'(i, J)}$ and $\overline{Q'(i, J)}$ in FIG. 5 can be separated and extracted. These signals are subjected to DPCM processing at the DPCM coders 4 and 4', and then transmitted over the transmission path. By introducing the circuit configuration shown in FIG. 8, the signals from 0-order sequence to 15-order sequence can be transmitted in series. Therefore, the multiplexer 5 of FIG. 7 is not necessary.

Figure 9:
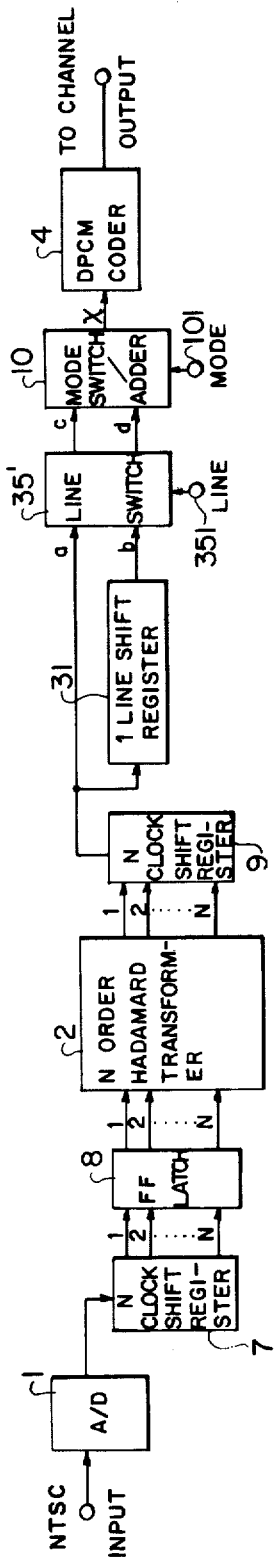
FIG. 9 is a block diagram of an alternative embodiment of a transmitter in accordance with the invention.

FIG. 9 is a detailed block diagram of an alternative embodiment of a transmitter in accordance with the invention. In this figure, the same numbering is used for the elements common to FIG. 7 and FIG. 8. The transmitter circuit of FIG. 9 includes an N-clock shift register 7, a latch circuit 8, an N-clock shift register 9, and a mode switch/adder circuit 10 having the functions of both the luminance-chrominance separator 3 shown in FIG. 7 and the mode switch 6 shown in FIG. 8. The latch circuit 8 can be formed of conventional flip-flop circuits. In this circuit configuration, when the numbers of orders of the Hadamard Transformation is 16, N = 16.

The NTSC composite signal is subject to A/D conversion via the A/D converter 1 and enters the N-clock shift register 7. When the number of transformation orders of the Hadamard Transformer 2 is N, the data for the N-order transformation is accumulated in the latch circuit 8 and applied in parallel to the N-order Hadamard Transformer 2, in accordance with N-clock times, and transformed therein by the method of Hadamard Transformation and then supplied in parallel to corresponding inputs of the N-clock shift register 9.

The series output from the N-clock shift register 9 is supplied to two branches. One branch applies the series output to the line switch 35' as the input $a$, and the other branch applied to the series output to the 1 line shift register 31, and thence to line switch 35 at the input $b$. The input b thus is delayed by the period of 1 line compared to the input a. Here, the inputs a and b have values of N-order (N = 1, 2, ..., N) of the Hadamard Transformation and generally they mean that the digital signals expressed by the codes have several digits. The line switch 35' functions to switch alternatively the inputs $a$ and $b$ to the outputs $c$ and $d$, respectively, for the adjacent lines, according to the line control signal input to the terminal 351. For example, for an odd line, the outputs are in the following relation: $c = a$, $d = b$; and for an even line, $c = b$, $d = a$. The mode switch/adder circuit 10, controlled by the MODE signal input to the terminal 101, performs the operation on the input signals $c$ and $d$ to output the sum and difference signals $(c + d)$ and $(c - d)$. These signals then are DPCM processed at 4 and transmitted to the transmission path.

Figure 11:
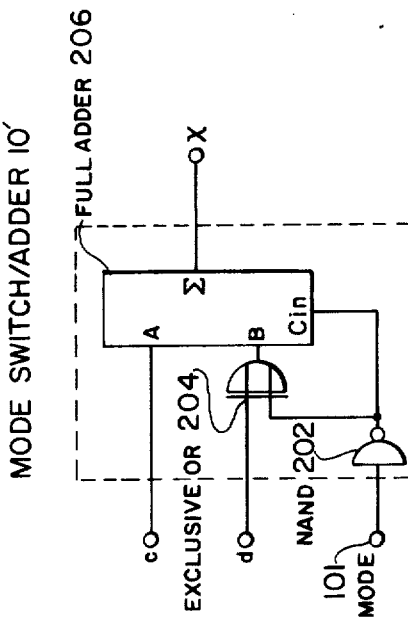
FIG. 11 is a logic circuit of a mode switch/adder used in FIG. 9.
Figure 10:
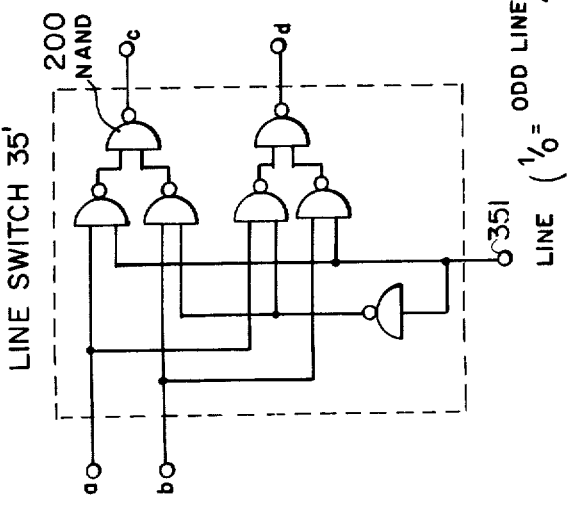
FIG. 10 is a logic circuit of a line switch used in FIG. 9.

An example of the circuit configuration of the line switch 35' is shown in FIG. 10 and that of the mode switch/adder circuit 10 is shown in FIG. 11; the time chart for the control thereof is shown in FIG. 12.

In FIG. 10, the line switch 35' comprises a NAND circuit 200 and associated logic gates. The LINE signal, as shown in FIG. 12B, is applied to the terminal 351. During this period of the 1st line, (see FIG. 12A), the signal "LINE" input to the terminal 351 is "1" (see FIG. 12B) and $c = a$, $d = b$ are produced as the outputs, while during the period of the 2nd line, LINE = 0 (FIG. 12B) and $c = b$, $d = a$ are produced as the outputs.

In FIG. 11, the mode switch/adder circuit 10 is composed of a NAND circuit 202, an exclusive OR circuit 204, and a full adder circuit 206. To the terminal 101, the MODE signal as shown in FIG. 12C is input and the output "x" as shown in FIG. 12D is obtained. Therefore, the signal component expressed by the equation (7) is obtained for the transformation orders 1, 2, ... N/2, while the signal component expressed by the equation (8) at the orders N/2, ... N. FIG. 12E shows the data number transformed by the Hadamard Transformation of N-order.

FIG. 13 shows an example of the circuit configuration of the DPCM coder 4. This circuit is composed of a subtracter 210, a quantizer 212, a ROM (Read only memory) 214, an adder 216, and a 1 line memory 218, as is well known. The input signal $x$ of $n$ bits is supplied to subtractor 210, and the signal values for the preceding one line period are used as the predicted value of $\bar{x}$.

Figure 14:
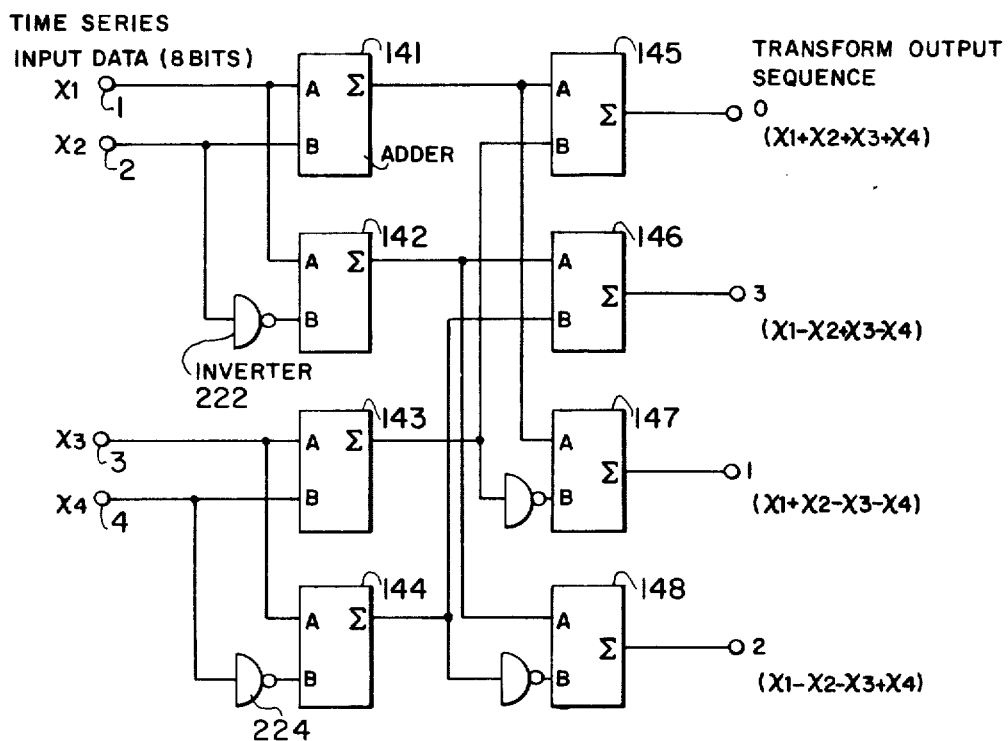
FIG. 14 is a circuit schematic of the Hadamard Transformation circuit.

FIG. 14 shows an example of the circuit configuration of the Hadamard Transformer, wherein a 4-order transformation is assumed, for simplified. As shown in this figure, the Hadamard Transformer 2 can be made up of the adders 141 and 144 and inverters 222 and 224.

When the input signals $x_1$, $x_2$, $x_3$, and $x_4$ are applied to the input terminals (1), (2), (3), and (4), outputs $(x_1 + x_2)$, $(x_1 - x_2)$, $(x_3 + x_4)$ and $(x_3 - x_4)$ are obtained from the adders 141, 142, 143 and 144, respectively, while the adders 145, 146, 147 and 148 produce as their inputs the 0-order sequence $(x_1 + x_2 + x_3 + x_4)$, the 3-order sequence $(x_1 - x_2 - x_3 - x_4)$, the 1-order sequence $(x_1 + x_2 - x_3 - x_4)$ and the 2-order sequence $(x_1 - x_2 - x_3 + x_4)$, respectively.

Figure 15:
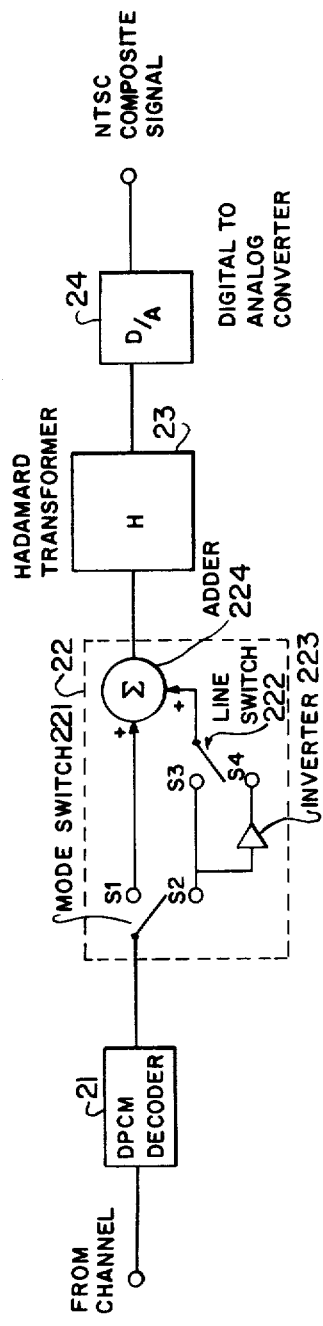
FIG. 15 is a block diagram of a receiver in accordance with the invention.

FIG. 15 is a block diagram of the receiver, including a DPCM decoder 21, a mode switch/adder circuit 22 including a mode switch 221 and a LINE switch 222, an inverter 223, an adder 224, a Hadamard Transformer 23, and a digital to analog (D/A) converter 24.

Functions and operations of this circuit configuration are as follows. This circuit receives the input signal from the transmission path, decodes it with the DPCM decoder 21, and then connects the decoder output to S1 by means of the MODE switch 221 for the 1-order to the N/2-order of the Hadamard Transformation output, or to S2 for the (N/2 + 1) to N-order component and thereby separates the lower order and high order components. On the other hand, the LINE switch 222 alternates its position between S3 and S4 for every line, inverting the polarity of the signal at S2 for alternate lines via the inverter 223. The time chart of the MODE switch 221 and LINE switch 222 at this time is the same, respectively, as that of FIG. 12B and 12C. This output is applied to the adder 224, from which the sum is applied as an input to the Hadamard Transformer 23. After the Hadamard Transformation, the output is applied to the D/A converter 24 and then the NTSC composite signal can be obtained as the output.

Figure 16:
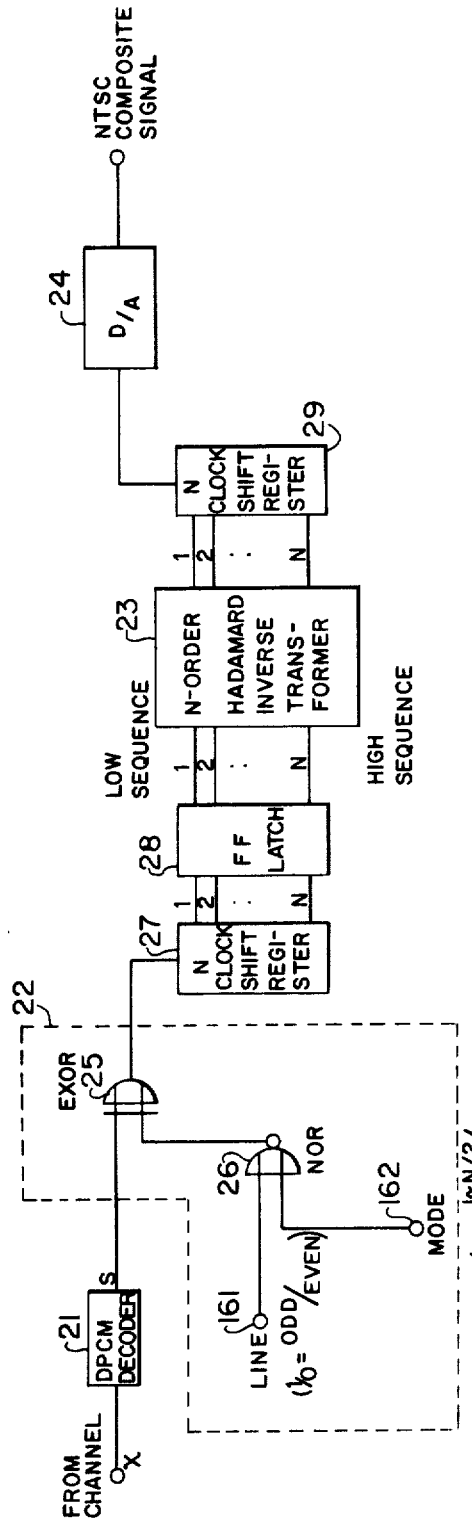
FIG. 16 is a block diagram of an alternative embodiment of the receiver circuit.

A more detailed receiver circuit configuration of an alternative embodiment is shown in FIG. 16. In this FIGURE, the same numbering is made for the parts common to those of FIG. 15. The circuit includes an exclusive OR gate 25; a NOR gate 26; an N-clock shift register 27; a latch circuit 28; an N-clock shift register 29; a LINE switch input terminal 161; and a MODE switch input terminal 162.

The output signal from the DPCM decoder 21 is applied to the exclusive OR gate 25. The output from the NOR gate 26 is applied to the exclusive OR circuit 25, the NOR gate 26 receiving the LINE signal from terminal 161 and the MODE signal from input terminal 162.

The LINE and MODE signals applied to the LINE switch input terminal 161 and the MODE switch input terminal 162, respectively, have waveforms as shown in FIGS. 12B and 12C. Where the polarity of the LINE signal applied to the LINE switch input terminal 161 is L, that of the MODE signal applied to the MODE switch input terminal 162 is M, the output of the NOR circuit is NOR, the output of the DPCM decoder 21 is D, and the output of the exclusive OR circuit 25 is EXOR, the following relation can be obtained:

TABLE

| L | M | NOR | D | EXOR |
|---|---|-----|---|------|
| 1 | 1 | 0   | 1 | 1    |
| 1 | 0 | 0   | 1 | 1    |
| 0 | 1 | 0   | 1 | 1    |
| 0 | 0 | 1   | 1 | 0    |

When considering the output EXOR in the above Table in combination with the time charts in FIGS. 12B and 12C, it can be understood that the polarity of the output from the DPCM decoder 21 is inverted only at the high order region of even lines. In other words, the polarity matching with the initial NTSC signal in the transmitter can be performed by this circuit.

The output from the exclusive OR circuit 25 enters the N-clock shift register 27 while "N" clocks are counted. Then the output from shift register 27 is applied to the latch circuit 28. This data is in turn applied to the Hadamard inverse transformer 23, which performs an inverse Hadamard Transformation.

The Hadamard inverse transformer 23 supplies the inverse transformed outputs thereof in parallel to the N-clock shift register 29. The N-clock shift register 29 then produces a serial data output. By converting the digital data to analog data by the D/A converter 24, the composite NTSC signal is obtained.

Figure 17:
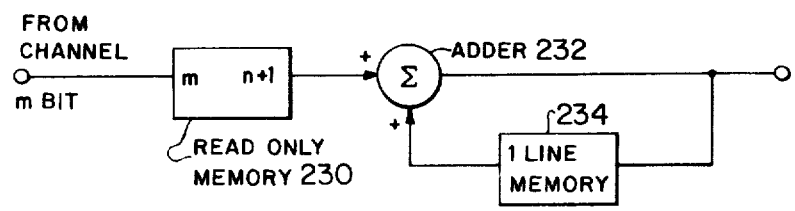
FIG. 17 is a block diagram of a DPCM decoder used in the circuit of FIG. 16.

FIG. 17 shows an example of the circuit configuration of the DPCM decoder 21, as is well known, and comprises a Read Only Memory 230, an adder 232 and a 1 line memory 234, through which the received signal, after the DPCM processing, is decoded.

Here, the Hadamard inverse transformer 23 may have the same configuration as that shown in FIG. 14. Described hereafter is the operation of Hadamard inverse transformation with a 4-order transformation output.

If the Hadamard transformed signals $(x_1 + x_2 + x_3 + x_4)$, $(x_1 + x_2 - x_3 - x_4)$, $(x_1 - x_2 - x_3 + 0 x_4)$ and $(x_1 - x_2 + x_3 - x_4)$ of 0, 1, 2 and 3-order sequence are applied to the input terminals (1), (2), (3) and (4) shown in FIG. 14, the adders 141, 142, 143 and 144 produce the respective outputs $(2x_1 + 2x_2)$, $(2x_2 + 2x_4)$, $(2x_4 - 2x_2)$, and $(-2x_3 + 2x_4)$. In addition, $4x_1$, $4x_4$, $4x_2$ and $4x_2$ are obtained from the adders 145, 146, 147 and 148, respectively, as the Hadamard inverse transformed outputs. By dividing them by 4 for normalization, the signals $x_1$, $x_2$, $x_3$ and $x_4$ before Hadamard Transformation at the transmitting side can be obtained.

In the embodiment mentioned above, the high order and low order range can be separated and extracted at the order of ½ of the transformation order (of N). However, it is obvious that the number orders, defining the separation boundary can be selected freely at any order.

By introducing the bandwidth-compression method disclosed in the present invention, the effect of the bandwidth-compression can be doubled through the orthonormal transformation in the line direction and, moreover, further compression of 0.5 to 0.7 bits can be realized without causing any deterioration of picture quality by utilizing the correlation of the video signal in the vertical direction for picture elements of successive lines.

Numerous modifications and adaptions of the method and system of the invention will be readily appreciated by those of skill in art and hence it will be appreciated that all such modifications and adaptions of the invention are intended to the encompassed by the appended claims.

What is claimed is:

1. A system for bandwidth-compressed transmission of NTSC video signals, comprising:
    input means for supplying a composite NTSC signal to be transmitted,
    means connected to said input means for converting the supplied composite NTSC video signal to corresponding digital signals, and means for orthonormally transforming said digital signals;

means responsive to said transformed digital signals for producing sum and difference signals as to each horizontal line period of the composite signal with respect to the respectively next preceding horizontal line period thereof, whereby said sum and difference signals respectively correspond to luminance and chrominance signals, means receiving the sum and difference signals for separately predictively coding each thereof, and means for sequentially transmitting said separately predictively coded sum and difference signals.

2. A system recited in claim I wherein said orthonormal transforming means produces transformed digital signals of high and low order sequences, and wherein there is further provided:

mode switch means for alternately selecting said sum and difference signals and supplying said alternately selected signals to said predictive coding means.

3. A system as recited in claim 1 further comprising: means connected between said predictive coding means and said transmitting means for multiplexing said predictively coded sum and difference signals for transmission.

4. A system as recited in claim 1 wherein said orthonormal transforming means comprises a Hadamard Transformer.

5. A system as recited in claim 1 wherein:

said predictive coding means comprises a Delta PCM coder.

6. A system as recited in claim 1 wherein a mode switch is provided for selecting said produced sum and difference signals and supplying said selected signals to said predictive coding means, and further wherein said sum and difference signal producing means comprises:

means for storing the transformed digital signals from said orthonormal transforming means corresponding to one horizontal line period of the composite video signal, for each such horizontal line period in succession, means for producing the sum of the transformed digital signals from said orthonormal transforming means corresponding to a given horizontal line period of the composite signal with the transformed digital signals stored in said storing means and corresponding to the respectively next preceding horizontal line period of the composite video signal, for each horizontal line period of the composite video signal, in succession, means for producing the difference of the transformed digital signals from said orthonormal transforming means corresponding to the given horizontal line period of the composite video signal and the transformed digital signals stored in said storing means and corresponding to the respectively next preceding horizontal line period of the composite vide signal, for each horizontal line period of the composite video signal, in succession, means for inverting the difference signal output of said difference signal providing means, means for supplying the difference output signal from said difference signal producing means and the inverted difference signal output of said inverter alternately in successive line periods to said mode switch, thereby to supply the difference video signal to said mode switch in a common polarity, and said mode switch further is connected to said sum signal producing means to receive the sum signal output thereof, thereby to alternately supply the sum signal and the difference signal to said predictive coding means.

7. A system as recited in claim 6 wherein said storing means comprises a shift register.

8. A system as recited in claim 1, further comprising:

first storing means connected to said input means for receiving in serial form the converted digital signal output of said converting means corresponding to one horizontal line period of the composite video signal and for storing the said digital signals and providing said stored digital signals to said orthonormal transforming means in parallel, said orthonormal transforming means transforming the parallel digital signals received from said first storing means and producing transformed parallel output digital signals, second storing means for receiving said parallel, transformed output signals from said orthonormal transforming means and storing the said signals and providing the said signals in serial form to said sum and difference signal producing means.

9. A system as recited in claim 8 wherein each of said first and second storing means comprises a shift register.

10. A system as recited in claim 1 further including a receiving system for the transmitted, bandwidth-compressed video signals comprising:

means for receiving and decoding said bandwidth-compressed, transmitted video signals and producing corresponding decoded digital signals, means for inversely orthonormally transforming said decoded digital signals to produce output digital signals corresponding to the composite video signal, and means for converting the output digital signals from said inverse orthonormal transforming means to corresponding analog composite video signals.

11. A receiving system as recited in claim 10 wherein said orthonormal transforming means comprises a Hadamard Transformer.

12. A receiving system as recited in claim 10 wherein said decoding means comprises a Delta PCM decoder.

13. A receiving system as recited in claim 10 wherein the decoded digital signals include high and low order sequence signals, further comprising:

means for inverting the high order sequence signals of the decoded digital signals corresponding to alternate horizontal lines of the composite video signal, first means for storing the decoded digital signals corresponding to one horizontal line period of the composite video signal, means for supplying the decoded digital signals of low order sequence from said decoder to said storing means and for applying the decoded digital signals of high order sequence alternately from said decoder and from said inverter for said alternate horizontal lines, in series form, said storing means providing the digital signals stored therein in parallel form to said inverse orthonormal transforming means, said inverse orthonormal transforming means producing parallel, inversely transformed, output digital signals, and second storing means for receiving and storing said parallel, inversely transformed output digital signals from said orthonormal transforming means and providing the said output digital signals stored therein in serial form to said digital to analog converting means.

14. A receiving system as recited in claim 13 wherein each of said first and second storing means comprises a shift register.

15. A system for transmission and reception of bandwidth-compressed video signals of the NTSC type, comprising:
a transmitter having supplied thereto a composite NTSC video signal to be compressed in bandwidth and transmitted, including:
an analog to digital converter for converting the composite NTSC video signal to corresponding digital signals,
means for orthonormally transforming said digital signals and producing transformed digital output signals,
means for producing sum and difference digital signals of the transformed digital signals corresponding to a given horizontal line period of the composite video signal with respect to the transformed digital signals corresponding to the respectively next preceding horizontal line period of the composite video signal,
whereby said sum and difference signals respectively correspond to luminance and chrominance signals,
means for predictively coding said sum and difference signals, and
means for supplying the predictively coded sum and difference signals for transmission to a receiver; and a receiver incluing:
means for receiving and decoding the signals transmitted by the transmitter to provide decoded digital signals,
means for inversely orthonormally transforming the decoded digital signals to produce digital output signals corresponding to the NTSC composite video signal, and
digital to analog converting means for converting the digital output signals to an analog NTSC composite video signal corresponding to the NTSC composite video signal supplied at the transmitter for transmission.

16. A system for transmission of bandwidth-compressed video signals of the NTSC type, comprising:
input means having supplied thereto a composite NTSC video signal to be compressed in bandwidth and transmitted,
an analog to digital converter for converting the composite NTSC video signal to corresponding digital signals,
means for orthonormally transforming said digital signals,
means for producing sum and difference digital signals of the transformed digital signals corresponding to a given horizontal line period of the composite video signal with respect to the transformed digital signals for the respectively next preceding horizontal line period of the composite video signal,
whereby said sum and difference signals respectively correspond to luminance and chrominance signals, and
means for separately predictively coding said sum and difference signals for bandwidth-compression and transmission.

17. A receiver for bandwidth-compressed, transmitted video signals wherein a composite NTSC video signal prior to transmission is converted to digital form and orthonormally transformed and the sum and difference signals of the transformed digital signals corresponding to successive horizontal line periods of the composite video signal with respect to the respectively next preceding horizontal line periods, are separately predictively coded for bandwidth compression and sequential transmission, whereby said sum and difference signals respectively correspond to luminance and chrominance signals, comprising:
means for receiving and decoding the signals transmitted by the transmitter to provide decoded digital signals,
means for inversely orthonormally transforming the decoded digital signals to produce digital output signals corresponding to the NTSC composite video signal, and
digital to analog converting means for converting the digital output signals to an analog NTSC composite video signal corresponding to the NTSC composite video signal supplied at the transmitter for transmission.

18. A method for bandwidth-compressed transmission of NTSC video signals, comprising:
supplying a composite NTSC signal to be transmitted,
producing sum and difference signals as to each horizontal line period of the composite signal with respect to the respectively next preceding horizontal line period thereof,
whereby said sum and difference signals respectively correspond to luminance and chrominance signals,
separately predictively coding the sum and difference signals, and
sequentially transmitting the separately predictively coded sum and difference signals.

19. A method as recited in claim 18, further comprising:
converting the supplied composite NTSC video signal to a corresponding digital signal, and
orthonormally transforming said corresponding digital signals, and
producing the sum and difference signals from the orthonormally transformed signals.

20. A method for receiving signals transmitted in accordance with the method as recited in claim 18, further including:
means for receiving and decoding said bandwidth-compressed, transmitted video signals and producing corresponding decoded output signals,
inversely orthonormally transforming said decoded output signals to produce digital signals corresponding to the composite video signal, and
converting the digital signals to corresponding analog composite video signals.

21. A method for transmission and reception of bandwidth-compressed video signals of the NTSC type, comprising:
supplying a composite NTSC video signal to be compressed in bandwidth and transmitted,
converting the composite NTSC video signal to corresponding digital signals,
orthonormally transforming said digital signals and producing transformed digital output signals,
producing sum and difference digital signals of the transformed digital signals corresponding to a given horizontal line period of the composite video signal with respect to the transformed digital signals for the respectively next preceding horizontal line period of the composite video signal, whereby said sum and difference signals respectively correspond to luminance and chrominance signals, separately predictively coding said sum and difference signals, and sequentially transmitting the separately predictively coded sum and difference signals, said method further including receiving and decoding the transmitted signals to provide decoded digital signals, inversely orthonormally transforming the decoded digital signals to produce digital output signals corresponding to the NTSC composite video signal, and converting the digital output signals to an analog NTSC composite video signal corresponding to the NTSC composite video signal supplied for transmission.

* * * * *